Oct. 14, 1952  E. C. WORDEN  2,613,764
CHOCK BLOCK FOR VEHICLES
Filed Nov. 15, 1949
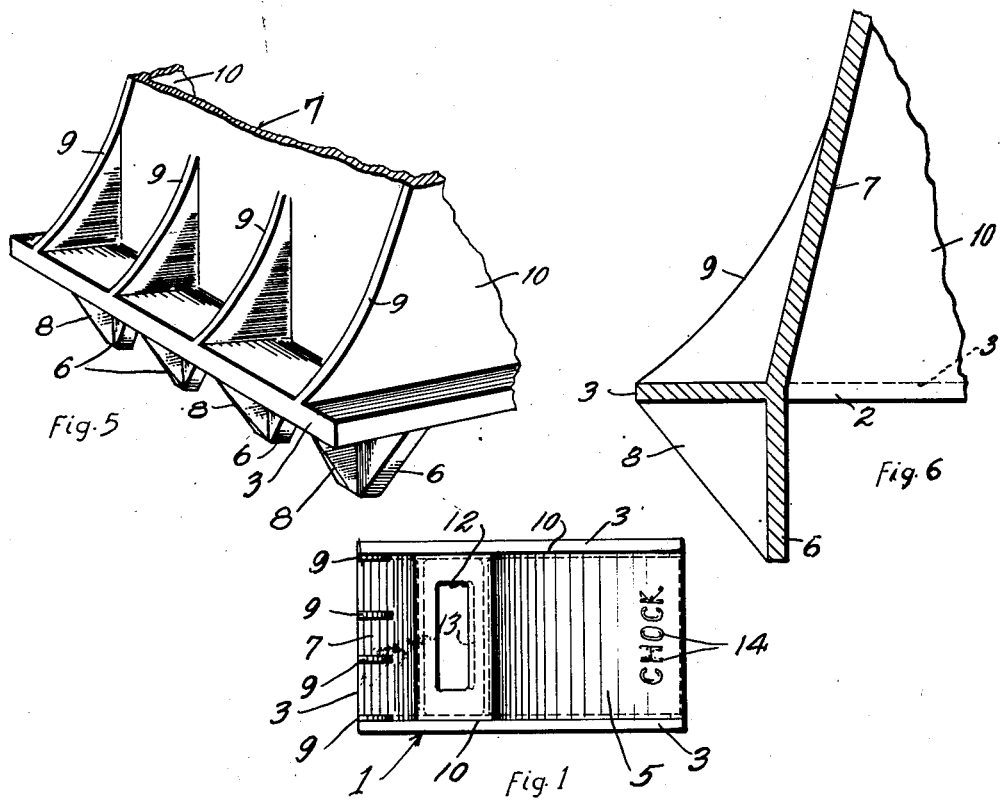
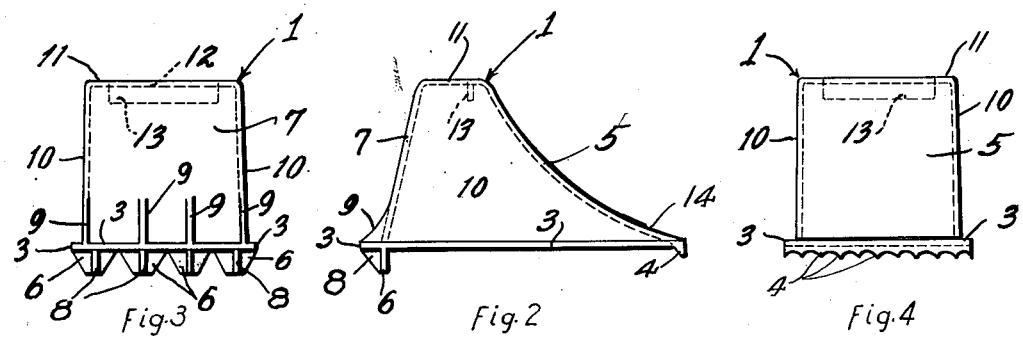
EDWARD C. WORDEN INVENTOR.
BY Max H. Farmer
Attorney Patented Oct. 14, 1952

2,613,764

UNITED STATES PATENT OFFICE 2,613,764

CHOCK BLOCK FOR VEHICLES

Edward C. Worden, Averill Park, N. Y.

Application November 15, 1949, Serial No. 127,313

7 Claims. (Cl. 188—32)

This invention relates to chocks for highway vehicles such as are commonly employed for trucks, busses and passenger cars. When a bus, truck or passenger car stops on a hill, either coming up or going down, it is unsafe to leave it merely with brakes set and in gear, because the brakes might be accidentally released or it might be accidentally released from gear. Wedge shaped chocks are placed behind or in front of a wheel. When it is necessary to change tires on such a vehicle, it is important to place chocks before and after another wheel so that the vehicle will not shift its position while the tire is being changed. Various previous attempts have been made to provide suitable chocks, for these purposes, but they have not been entirely satisfactory. When made sufficiently strong to carry the load of a wheel pushing against the same, they were heavy and unwieldly to handle. They have also been unsafe to use because they often slid when a wheel pushed against the same.

An object of this invention is to provide an improved chock which will be sufficiently strong and rigid for use with the heaviest of trucks and busses; which will not slip or slide when a wheel pushes against the same, but which will more effectively grip the pavement; which will be useful and effective not only on dry pavements but on those covered with ice and snow; which will be light enough to be easily and conveniently handled; which will effectively resist deformation when in use; and which will be relatively simple, strong and durable in construction and relatively inexpensive.

Other objects and advantages will be apparent from the following description of one embodiment of the invention, and the novel features will be particularly pointed out hereinafter in connection with the appended claims.

In the accompanying drawing:

Fig. 1 is a plan of a chock constructed in accordance with this invention and shown on a reduced scale;

Fig. 2 is a side elevation of the same;

Fig. 3 is a rear end elevation of the same;

Fig. 4 is a front end elevation of the same;

Fig. 5 is a perspective, on a larger scale, of the lower rear part of the member; and Fig. 6 is a transverse sectional elevation, on a still larger scale, of the part shown in Fig. 5, the section being taken immediately to one side of one of the reenforcing webs and looking toward the web.

In the illustrated embodiment of the invention, the improved chock is a generally wedged-shaped, hollow member 1, having an open bottom face 2, Fig. 6. The bottom of the member is provided along its side and rear edges with a horizontal, outwardly extending flange 3 which stiffens and reinforces the lower edge of the member. The forward edge of the member has a row of depending, relatively short, sharp teeth 4, which bite into the pavement and any ice or snow thereon when a wheel rocks against this chock member. The forward end face 5 of this chock is concave and arcuate, in the nature of a segment of a cylinder, whose curvature corresponds approximately to that of the periphery of the wheel or tire against which the chock is to be used. This concave face 5 at its lower edge, makes a very few degrees of inclination to the horizontal so as to provide the wedge shape that enables it to be slid nearly under a wheel in blocking position thereto.

Disposed along the rear edge of the member 1 is another row of depending, tapered teeth 6 which are vertically longer than the teeth 4 so as to have a greater length from the pavement or surface on which the chock member is placed. The teeth 6 are disposed immediately below and aligned with the lower edge of the rear wall 7 of the member, so as, in effect, to form a downward continuation of the wall 7 except that the wall 7 is inclined somewhat to the vertical and the teeth 6 are preferably vertical. A triangular web 8 is integral with and connects the middle of the rear face of each tooth 6 with the rearwardly extending flange 3, so as to reinforce the teeth to resist forward and rearward flexing, whenever a load is placed on the member.

A plurality of triangular webs 9, provided above the rearwardly extending flange 3, are integral with and connect flange 3 and wall 7 and stiffen the rearwardly extending flange 3 against vertical flexing when the webs 8 exert pressures thereon due to forces attempting to flex the teeth 6 forwardly and rearwardly. Preferably the webs 9 are approximately vertically aligned with the webs 8 that join the teeth 6 to the flange 3. The side walls 10 of the member extend rearwardly in their lower rear corners to form the side webs 9.

The top wall 11 of the member 1 is provided with an aperture 12 through which one may insert the fingers of one's hand in order to lift the member and manipulate it into and out of blocking position. A flange 13 struck out of top wall 11 may depend from one edge of the aperture 12 in order that one may grip the fingers around it when inserted through aperture 12, and thus enable one to more firmly grip and hold the member while manipulating it. On the concave face 5, adjacent its lower margin, I provide raised ribs 14 extending in different directions so that when a pneumatic tire rolls on this concave face, the tread of the tire will be distorted over these ribs, or the ribs will indent themselves into the tread, and resist sliding of the member horizontally over the pavement. In Fig. 1, these ribs are shown as spelling the word "Chock," and obviously they may spell any suitable word such as preferably the name of the manufacturer.

In use, each vehicle should carry at least two of these improved chocks, and if the vehicle stops on a grade, these chocks will be placed in front of or behind two wheels as may be necessary to stop the vehicle, so that if the brakes fail or the transmission inadvertently releases or shifts into neutral, the vehicle, as it starts to roll, will cause the tires to ride upon and engage against the concave faces 5 of the chock members. The tread will exert a pressure normal to the concave face where it engages it. At the front of the block or member, the pressure will cause the teeth 4 to grip or bite into the pavement, and the indentation of the ribs 14 into the tread will resist any horizontal pressure component that tends to move the chock horizontally from beneath the tire. The ribs 14 are placed at the lower part of the concave face, so that the tire pressure thereon will be largely downwardly, which increases the resistance to any pressure tending to move the chocks away from the wheel.

When a wheel rolls upon the chock or member 1, it exerts against the face 5 a pressure which is downwardly and rearwardly inclined, and this has a horizontal component which urges the member horizontally in the direction in which the wheel is pushing it, and another and vertical component that forces the member 1 against the pavement. By having the ribs 14 indent themselves into the tread of the tire, as the wheel rolls upon or against the chock member 1, the ribs 14 will resist horizontal slipping of the member beneath the tire and thus largely balance the horizontal pressure component that otherwise would tend to move the member horizontally in the direction in which it is being pushed by the wheel.

In order that the friction between the member and the pavement be a maximum, even when the pavement is icy or snowy, the teeth 4 and 6 have pointed ends that bite into the pavement and thus resist sliding of the member on the pavement with the wheel. The webs 8 and 9 and the flange 3 give rigidity and strength to the rear end of the member, and to the larger teeth 6, so that the improved chock may have sufficient rigidity and strength without undue weight. By using the webs 8 and 9 and the flange 3, the necessary rigidity and strength are obtained, yet the thickness of the walls of the member may be kept to a minimum in order to lighten its weight.

While the member 1 may be made of parts cut from heavy sheet steel, some bent into shape, and then all welded together, I preferably make the member as a one-piece malleable iron casting which does not require any core. This eliminates expensive special operations such as cutting, welding and bending of heavy sheet steel. Malleable iron is stronger than cast iron, and therefore, it can be made lighter in weight, in order to sustain a selected load, than would be necessary if it were made of cast iron.

It will be understood that various changes in the details and arrangements of parts, which have been herein described and illustrated in order to explain the nature of the invention, may be made by those skilled in the art within the principle and scope of the invention as expressed in the appended claims.

I claim:

1. A chock block for wheels of highway vehicles which comprises a generally wedge shaped, hollow member having its forward end face concave and a segment of a cylinder with a curvature approximately fitting the periphery of a wheel against which it may be wedged and continuing downwardly to substantially the level of the bottom of said member, said member having a row of short, depending teeth along its forward edge, and another row of longer and larger teeth along its rear edge, said member having a rearwardly extending flange along its rear edge, and stiffening webs connecting sides of said longer teeth and said flange to brace them against flexing.

2. A chock block for wheels of highway vehicles which comprises a generally wedge shaped, hollow member having its forward end face concave and a segment of a cylinder with a curvature approximately fitting the periphery of a wheel against which it may be wedged, said member having a row of short, depending teeth along its forward edge, and another row of longer and larger teeth along its rear edge, said member having a rearwardly extending flange along its rear edge, stiffening webs connecting sides of said longer teeth and said flange to brace them against flexing, and additional stiffening webs connecting said flange and the rear wall of said member to resist flexing of said flange.

3. A chock block for wheels of highway vehicles which comprises a generally wedge shaped, hollow member having an open bottom face with an external horizontal flange surrounding said open face, said member also having its forward wedge face, concave and a segment of a cylinder, with a curvature that approximately fits the periphery of a wheel against which it may be wedged, said member having short depending teeth along its forward and rear edges below said flange, the teeth along the rear edge being longer than those along the forward edge, and webs connecting a face of each rear edge tooth to said flange.

4. A chock block for wheels of highway vehicles which comprises a generally wedge shaped, hollow member having an open bottom face with an external horizontal flange surrounding said open face, said member also having its forward wedge face, concave and a segment of a cylinder, with a curvature that approximately fits the periphery of a wheel against which it may be wedged, said member having short depending teeth along its forward and rear edges below said flange, the teeth along the rear edge being longer than those along the forward edge, webs connecting a face of each rear edge tooth to said flange, and additional webs connecting said flange to the rear upright end wall of said member, spaced apart along the flange at the rear of said member.

5. A chock block for wheels of highway vehicles which comprises a generally wedge-shaped, unitary hollow member of metal, having an open bottom face, an inclined, arcuate, concave, wheel-engaging, front face terminating at its lower end substantially at the level of the open face, a row of teeth arranged along said lower end, extending from side to side and depending below said open bottom face, a rearwardly and downwardly inclined rear end wall, side walls connecting corresponding sides of said inclined end walls, said rear end wall extending beyond said open face and having notches in its lower edge extending to said open face, to form substantially vertical teeth, and braces along the rear faces of the teeth in the lower edge of the rear end wall to resist their bending.

6. A chock block for wheels of highway vehicles which comprises a generally wedge-shaped, hollow member of metal, having an open bottom face, an inclined, wheel-engaging, front face terminating at its lower end substantially at the level of the open face, a row of teeth arranged along said lower end, extending from side to side and depending below said open bottom face, a rearwardly and downwardly inclined rear end wall, side walls connecting corresponding sides of said inclined end walls, substantially vertical teeth disposed approximately below the lower end of said rear end wall, and depending below said open bottom face, said rear end wall having a rearwardly extending horizontal flange from side to side, and bracing webs connecting the lower face of said horizontal flange to the rear faces of said vertical teeth below the rear end wall.

7. A chock block for wheels of highway vehicles which comprises a generally wedge-shaped, hollow member of metal, having an open bottom face, an inclined, wheel-engaging, front face terminating at its lower end substantially at the level of the open face, a row of teeth arranged along said lower end, extending from side to side and depending below said open bottom face, a rearwardly and downwardly inclined rear end wall, side walls connecting corresponding sides of said inclined end walls, substantially vertical teeth disposed approximately below the lower end of said rear end wall, and depending below said open bottom face, said rear end wall having a rearwardly extending horizontal flange from side to side, bracing webs connecting the lower face of said horizontal flange to the rear faces of said vertical teeth below the rear end wall and stiffening walls connecting the upper face of said horizontal flange to said rear end wall and progressively decreasing in size as they progress up the rear end wall.

EDWARD C. WORDEN.

REFERENCES CITED

The following references are of record in the file of this patent:

UNITED STATES PATENTS

| Number | Name | Date |
| --- | --- | --- |
| 571,641 | Boose | Nov. 17, 1896 |
| 782,036 | Larison | Feb. 7, 1905 |
| 1,610,112 | Wendle et al. | Dec. 7, 1926 |
| 1,776,303 | Tucker | Sept. 23, 1930 |
| 2,182,044 | Ackerman | Dec. 5, 1939 |
| 2,475,111 | Ridland | July 5, 1949 |
| 2,481,065 | Auten | Sept. 6, 1949 |

FOREIGN PATENTS

| Number | Country | Date |
| --- | --- | --- |
| 30,298 | Denmark | Sept. 18, 1922 |
| 205,322 | Great Britain | Oct. 18, 1923 |
| 497,605 | Germany | May 13, 1930 |